United States Patent [19]

Stokes

[11] Patent Number: 4,700,259

[45] Date of Patent: Oct. 13, 1987

[54] ELECTRICAL CIRCUIT BREAKING DEVICE

[75] Inventor: Anthony D. Stokes, Wahroonga, Australia

[73] Assignee: University of Sydney, Sydney, Australia

[21] Appl. No.: 795,625

[22] Filed: Nov. 6, 1985

[30] Foreign Application Priority Data

Nov. 16, 1984 [AU] Australia .............................. PG8166

[51] Int. Cl.[4] .............................................. H02H 9/02

[52] U.S. Cl. .................................. 361/103; 361/124; 337/290

[58] Field of Search ....................... 361/103, 104, 124; 337/290, 190

[56] References Cited

U.S. PATENT DOCUMENTS

| | | | |
|---|---|---|---|
| 1,157,919 | 10/1915 | Arsem | 337/290 X |
| 2,276,184 | 3/1942 | Garrison et al. | 337/290 X |
| 2,548,491 | 4/1951 | Peek, Jr. | 337/290 X |
| 3,747,041 | 7/1973 | Cameron | 337/290 X |
| 3,909,765 | 9/1975 | Link | 337/290 X |

*Primary Examiner*—A. D. Pellinen
*Assistant Examiner*—Derek S. Jennings
*Attorney, Agent, or Firm*—Ladas & Parry

[57] ABSTRACT

A circuit breaking device which comprises an elongate conductive element located within a casing and connected in series with a helical spring. The spring exerts a tensile load on the conductive element, and the conductive element is formed from a material such as copper which will yield and fracture mechanically under the influence of the tensile load when the conductive element is subjected to a current induced heating level greater than a predetermined level.

11 Claims, 3 Drawing Figures

ELECTRICAL CIRCUIT BREAKING DEVICE

FIELD OF THE INVENTION

This invention relates to a circuit braking device and, in particular, to a device for use in lieu of a conventional fuse in a high voltage electrical distribution system. Such systems may operate at voltage levels in the order of 11 kV to 33kV and may carry fault currents typically to 8,000 amps or, in some applications, to 13,000 amps. However, whilst the invention is to be described herein in the context of a high voltage distribution system protection device, it should be understood that the invention may be employed in other electrical systems and at markedly different operating current and voltage levels.

BACKGROUND OF THE INVENTION

Fuses typically are used in overhead electrical distribution systems for connecting line conductors to the primary terminals of pole-mounted step-down transformers, and the fuse elements of such fuses are carried within so-called "drop-out" fuse carriers. In the event of an over-current fault condition in a line, an associated fuse element is caused to melt in the usual way and, as a consequence, the fuse carrier then pivots (drops) downwardly to increase the effective path length available for electrical isolation. When the fuse carrier pivots downwardly, molten metal or hot globular remnants of the fuse element can drop or be expelled from the fuse carrier and may start a ground fire.

SUMMARY OF THE INVENTION

The present invention is directed to a device which, when subjected to a fault current, yields under a mechanical load rather than as a consequence of melting and which, whilst subject to current induced heating, does not need to reach melting temperatures to operate as a circuit breaking device. Thus, the device functions in a manner somewhat similar to a fuse element, in the sense that a conductive link is broken. But the break is caused by mechanical fracture rather than by fusing or melting. As a consequence a significantly smaller amount of molten metal is produced, relative to that which would be produced by a conventional fuse, and the potential for damage is greatly reduced.

Broadly defined, the present invention provides a circuit breaking device which comprises an elongate conductive element, means connected to the conductive element for exerting a tensile load on the element, a casing housing the conductive element, and means permitting connection of the device in an electrical circuit. The conductive element is formed from a material which will yield and fracture mechanically under the influence of the tensile load when the conductive element is subjected to a current induced heating level greater than a predetermined level.

The invention may also be defined as providing a method of protecting an electrical circuit against fault currents, wherein an elongate conductive element is located in the circuit. The conductive element is subjected to a tensile loading and the conductive element is formed from a material which will yield and fracture mechanically under the influence of the tensile load when the conductive element is subjected to a current induced heating level greater than a predetermined level.

OPERATING FEATURES OF THE INVENTION

In operation of the device, the conductive element and the load exerting means are connected in series or series-parallel between end anchor points and, under normal operating conditions, a relatively low level current flows through the conductive element. Thus, under the normal conditions, the current is not sufficient to cause significant heating of the conductive element and the element resists the tensile loading of the load exerting means. However, when a fault current flows through the conductive element, current-induced heating occurs in the element and annealing (heat softening) of the element occurs.

As a direct result of the heat softening process, the yield point of the conductive element reduces to a level which is lower than the tensile loading applied by the load exerting means, and the element will begin to elongate. With elongation of the element and a consequential reduction occurring in the cross-section of the element, the current density increases and a greater heating effect results. This compounding effect occurs very rapidly and fracturing of the element results. Then, under the influence of the load exerting means, the separated ends of the conductive element are drawn apart to immediately increase the arc discharge path length within the casing.

PREFERRED FEATURES OF THE INVENTION

The conductive element preferably comprises copper wire or a wire formed from a copper alloy such as phosphor-bronze or constantan. However, other materials which have a relatively low yield point when subjected to heat softening temperatures and which have a relatively low softening temperature (e.g., for copper, approximately 400° C.) may be employed.

Moreover, the conductive element preferably is formed over a small portion only of its total length with a reduced cross-sectional area. This small part of the length of the element preferably is located midway along the total length of the element so that it is disposed approximately midway along the length of the casing for the conductive element.

The load exerting means preferably comprises a spring. In one embodiment of the invention the spring comprises a helical spring which is shunted by a flexible conductor which has a length corresponding approximately to or greater than the maximum extension of the spring.

The invention will be more fully understood from the following description of a preferred embodiment of the circuit breaking device which is illustrated in the accompanying drawings.

DETAILED DESCRIPTION OF THE INVENTION

Figures 1, 1A:
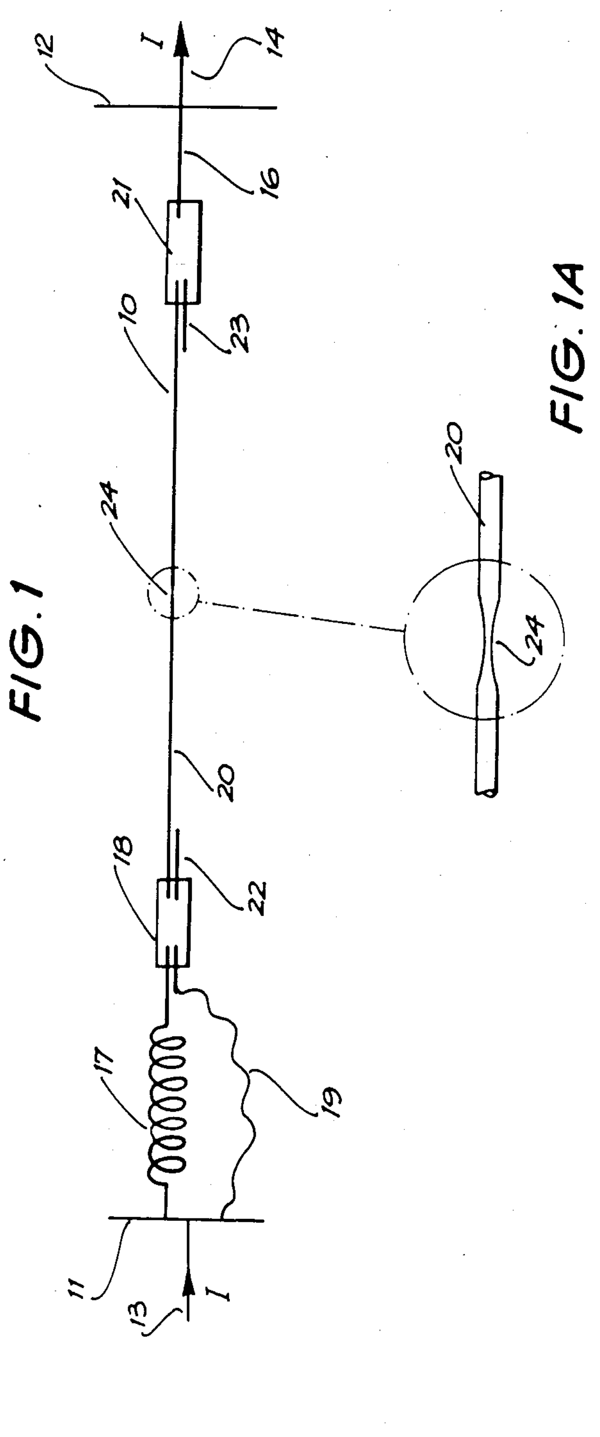
FIG. 1 shows a view of conductive components of the circuit breaking device anchored between end supports.
FIG. 1A shows a portion of a conductive element of the device on a larger scale.

As illustrated in FIG. 1, the device 10 is connected between anchor points 11 and 12, with the anchor points providing for current flow into and from the device by way of conductors 13 and 14. In normal usage, the device may be constructed in the manner shown in FIG. 2 of the drawings and will be housed within a conventional drop-out fuse carrier.

Figure 2:
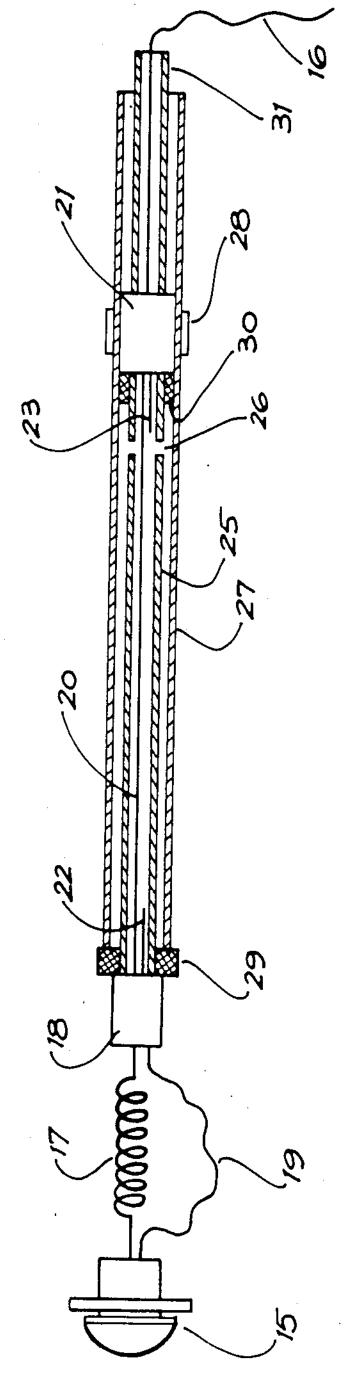
FIG. 2 shows a sectional elevation view of a complete circuit breaking device which is in a form which is suitable for mounting within either a drop-out fuse carrier or a fixed carrier (not shown) of a type which is used extensively in high voltage distribution systems.

When located within a drop-out fuse carrier, the device as illustrated in FIG. 2 will be anchored at its ends in the usual way, that is, by locating a mushroom-headed ferrule 15 on a shoulder at one end of the fuse carrier and by tying and clamping a pig-tail conductor 16 at the other end of the device to a terminal clamp on the drop-out fuse carrier.

The device as illustrated in FIG. 1 comprises a helical tension spring 17 which is connected and maintained under tension between the anchor point 11 and a ferrule 18. Also, a length of flexible (pig-tail) conductor 19 is connected between the same two elements and in parallel with the spring.

A conductive element 20 in the form of length of copper wire extends from the ferrule 18 to a further ferrule 21, and two short lengths 22 and 23 of copper wire extend toward one another from the ferrules 18 and 21 in a direction parallel with the conductive element 20.

A further flexible (pig-tail) conductor 16 extends from the ferrule 21 and corresponds with the item carrying the same reference numeral in FIG. 2.

The elements 17, 19, 20 and 22 are connected mechanically and electrically within the ferrule 18, as are elements 16, 20 and 23 in ferrule 21.

The conductive element 20 is formed from cold drawn (i.e., work hardened) copper wire and it is conditioned at a mid-region 24 of its length by:

(a) heat softening the mid-region of the wire by passing an electrical current through the wire in such region and causing localised current-induced heating of the wire, and, thereafter, (b) cold drawing (work hardening) the mid-region of the wire by elongating it and, as a consequence, reducing the cross-sectional area of the wire.

The entire length of the wire 20 is work hardened such that, at its weakest point, its yield point occurs at a level between 50% and 100% of the breaking load under ambient conditions. Also, the wire is selected such that, when softened with the existence of a temperature in the order of 400° C., the yield point (at the high temperature) will occur at a level not greater than 20% of the breaking load of the element under ambient conditions.

The spring is designed and stressed so as to provide a load on the conductive element 20 which corresponds with a load equal to approximately 30% of the breaking load of the conductive element under ambient conditions. Thus, the spring exerts a tensile loading which is greater than that necessary to induce yielding of the conductive element when it is softened by a temperature approaching 400° C.

Therefore, it follows that, when the device passes a current which is sufficiently high as to cause current induced heating of the conductive element 20 to a temperature in the region of 400° C., softening of the conductive element will occur in the mid-region 24 of the conductive element and the force exerted by the spring 17 will be sufficient to cause yielding of the conductive element in the mid-region 24. As the material does yield, its cross-sectional area will decrease, the current density flowing through such cross-sectional area will increase, a further heating effect will occur and the conductive element will fracture at the point where the tensile loading is most concentrated. Thereafter, the tension spring 17 will contract to cause the separated ends of the conductive element 20 to part rapidly and thereby increase the length of the arc discharge path between the separated ends of the conductive element.

Arcing which occurs as a result of parting of the two portions of the conductive element 20 will be contained and relatively large metal components of the device will be prevented from becoming involved in the arc discharging process by reason of the construction which is shown in greater detail in FIG. 2 of the drawings.

Thus, a polytetrafluroethylene tube 25 surrounds the conductive element 20 and, but for a slit 26 in the tube adjacent one of its ends, the tube extends between and interconnects the two ferrules 18 and 21. That is, the conductive element 20 is wholely located within the tube 25 but the slit 26 is provided to permit unrestrained elongation of the conductive element 20 under the influence of the spring 17.

Additionally, an outer plastics material tube 27 surrounds the tube 25 and extends over and is clamped to the ferrule 21 by a clamping ring 28. Teflon washers or plugs 29 and 30 are positioned to protect the ferrules 18 and 21 from any arc discharge, and a plastics material sleeve 31 is provided for covering a short portion of the length of the conductive tail 16.

I claim:

1. A circuit breaking device which comprises an elongate conductive element, means connected to the conductive element for exerting a tensile load on the conductive element, a casing housing the conductive element, and means for connecting the conductive element into an electrical circuit, the conductive element being formed from a material for yielding and fracturing mechanically under the influence of the tensile load when the conductive element is subjected to a current induced heating level greater than a predetermined level.

2. The device as claimed in claim 1 wherein the means for exerting the tensile load on the conductive element comprises a spring which is connected to the conductive element.

3. The device as claimed in claim 2 wherein the spring comprises a helical spring which is connected in series with the conductive element.

4. The device as claimed in claim 3 wherein a flexible conductor as connected in parallel with the spring, the flexible conductor having a length greater than the normal extended length of the spring.

5. The device as claimed in claim 1 wherein the conductive element is formed over a portion of its length with a region having a cross-sectional area which is reduced relative to that of the remaining length of the conductive element.

6. The device as claimed in claim 5 wherein the region of reduced cross-sectional area is located approximately mid-way along the length of the conductive element.

7. The device as claimed in claim 1 wherein the conductive element extends between spaced-apart metal ferrules, and wherein the casing includes a heat resistant plastics material tubing which surrounds the conductive element, which extends between the metal ferrules and which is arranged to permit unrestrained extension of the length of the conductive element.

8. The device as claimed in claim 1 wherein the conductive element comprises cold drawn copper wire or a wire formed from a copper alloy.

9. A method protecting an electrical circuit against fault currents, comprising locating an elongate conductive element in an electrical circuit, and subjecting the conductive element to a tensile, load and yielding and mechanically fracturing the conductive element under the influence of the tensile load when the conductive element is subjected to a current induced heating level greater than a predetermined level.

10. The device as claimed in claim 1, wherein the conductive element is formed from a material for the yielding before the mechanical fracturing, whereby the conductive element begins to elongate under the tensile load, the cross-section of the conductive element across the tensile load is reduced, the density of the current therethrough is increased, and greater heating therefore occurs for the mechanical fracturing thereafter.

11. The method as claimed in claim 9, wherein the yielding occurs before the mechanical fracturing for first increasing the density of the current by reducing the cross-section of the conductive element and thereafter mechanically fracturing the conductive element by the greater heating of the increased current density.

* * * * *